Figure 1:
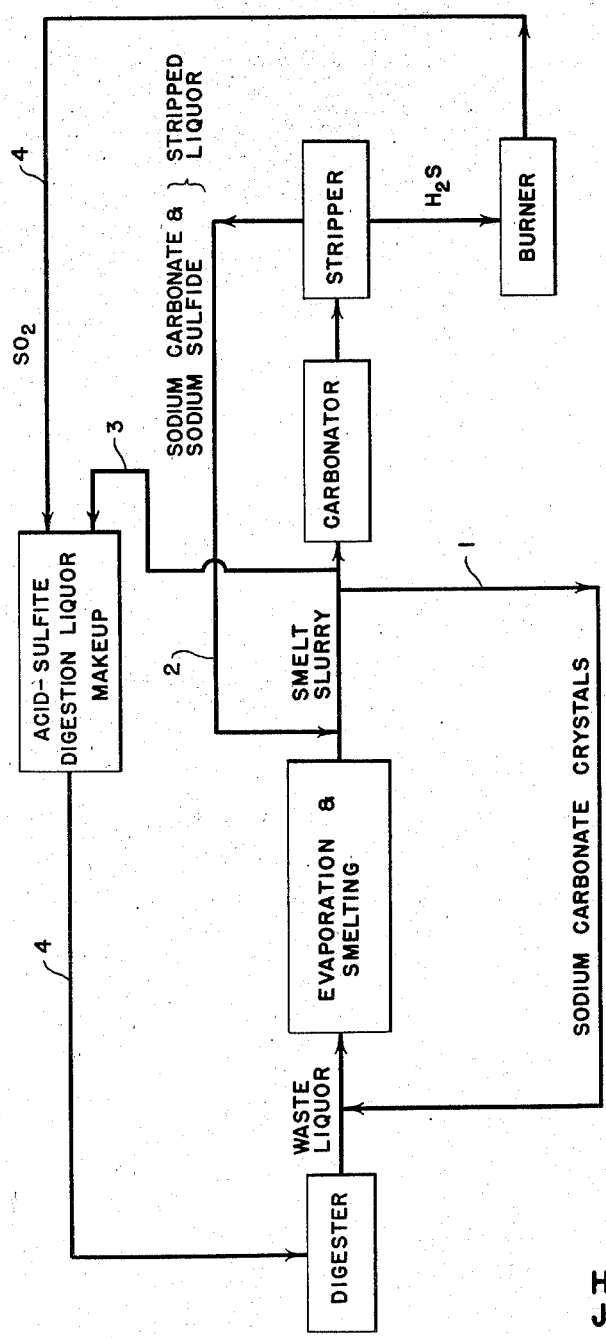

Feb. 18, 1958   K. R. GRAY ET AL   2,824,071
RECOVERY OF CHEMICALS IN WOOD PULP PREPARATION
Filed May 13, 1953   2 Sheets-Sheet 1

INVENTORS
Kenneth Russell Gray
Hartzell Lance Crosby
John Charles Steinberg

BY
Pennie, Edmonds Morton Barrows & Taylor
ATTORNEYS

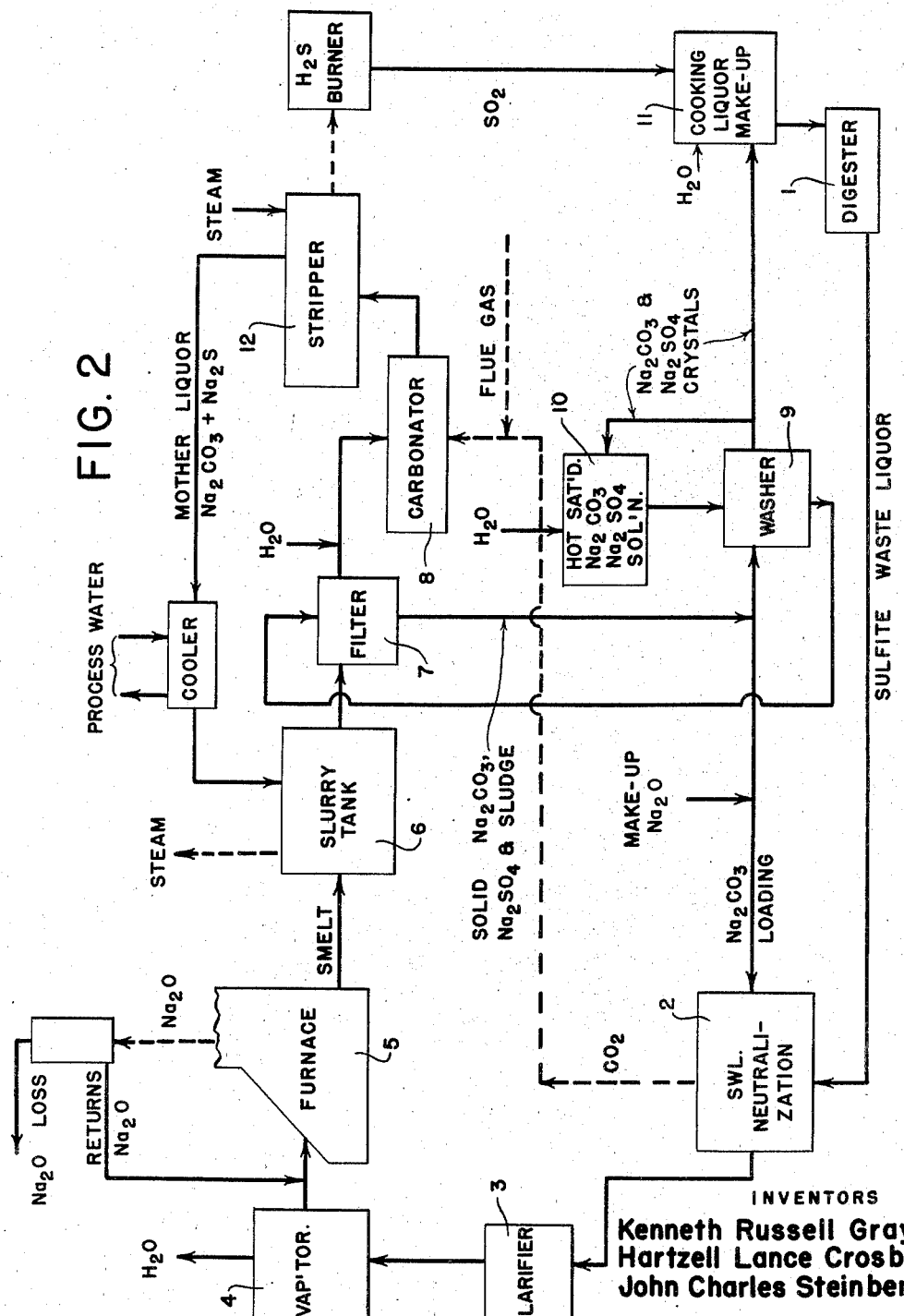

United States Patent Office 2,824,071
Patented Feb. 18, 1958

2,824,071
RECOVERY OF CHEMICALS IN WOOD PULP PREPARATION

Kenneth Russell Gray, Hartzell Lance Crosby, and John Charles Steinberg, Shelton, Wash., assignors to Rayonier Incorporated, Shelton, Wash., a corporation of Delaware Application May 13, 1953, Serial No. 354,735

9 Claims. (Cl. 252—183)

This invention relates to the digestion of wood chips with a soda-base acid sulfite aqueous liquor and has for its object the provision of an improved process for the recovery of the chemicals from the sulfite waste liquor and their cyclic use in the process. More particularly, the process of the invention is concerned with the formation of sodium carbonate in the process and its utilization to form make-up soda-base acid-sulfite liquor and also its addition to the waste liquor prior to furnacing to flux and lower the melting point of the smelt so that it will flow out of the smelting furnace.

The process of the invention provides the important advantages of retaining in the smelt of fused soda chemicals a large proportion of the sulfur which would otherwise be lost with the flue gases in very dilute form, a means of recovering the sulfur retained in the smelt in a concentrated readily utilizable form, and an economical means of neutralizing the very acid waste liquor prior to evaporation, thereby eliminating the necessity of using expensive, corrosion-resistant equipment.

Heretofore, soda-base acid sulfite pulping has not been considered practical due to the very high cost of the sodium salts required as compared to calcium salts and due also to the inability to recover the chemicals used in a form suitable for re-use. Although soda-base acid sulfite waste liquor may be readily evaporated and the concentrated liquor burned under reducing conditions, due to the molar excess of sulfur over sodium in the waste liquor, the inorganic residue of soda chemicals will be extremely corrosive at furnace temperatures and will have such a high melting point that it will not readily flow from the furnace as a smelt.

Also, in view of the molar excess of sulfur over sodium in soda-base acid sulfite waste liquor, more than half of the sulfur in the waste liquor will be lost up the stack in such dilute and contaminated form that any recovery would involve a costly if not prohibitive operation. Furthermore, the acid sulfite waste liquors customarily having a pH of 2 to 3 are extremely corrosive and as a result, suitable materials of construction for liquor handling and evaporation are very expensive, involving a substantial capital investment.

In addition to the difficulties of recovering the soda chemicals from the furnace in the form of a fluid smelt, methods have not been heretofore available for the practical conversion of such sulfide-containing smelts into a form suitable for the preparation of acid sulfite digestion liquor.

The process of this invention overcomes the difficulties heretofore encountered and provides an efficient practical process for recovering soda-base chemicals for use in the process, the elimination of the pollution of streams and other waters with waste liquor, and the recovery of heat from the combustion of the organic material of sulfite waste liquor which may amount to around 8–9000 B. t. u. per pound of dry organic solids.

In the pulping of wood by the sodium-base acid sulfite process, the predominant reaction is the conversion of the insoluble lignin in the wood to soluble sodium lignosulfonate which dissolves in the sulfite waste liquor. On burning such waste liquor, large amounts of sulfur will be lost in volatile form (i. e. as $SO_2$) and a smelt of extremely high sulfidity will tend to be formed. This will be evident from the following theoretical equation for the combustion of sodium lignosulfonate assuming that all available sodium will combine with sulfur.

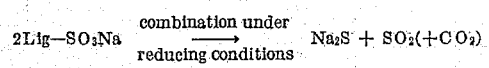

$$2\text{Lig–SO}_3\text{Na} \xrightarrow[\text{reducing conditions}]{\text{combination under}} \text{Na}_2\text{S} + \text{SO}_2(+\text{CO}_2)$$

In practice, the proportion of sulfur lost as dilute $SO_2$ in the stack will be larger than that in the above equation since sulfite waste liquor effluents are very acid and contain free lignosulfonic acids in addition to sodium lignosulfonate and may also contain some sulfur dioxide which has not been removed by stripping.

Also, in practice even more sulfur will be lost than that indicated by the theoretical considerations above since the sodium of the sodium lignosulfonate will not all form sodium sulfide but some sodium carbonate will form with additional loss of $SO_2$ in the stack gases. The formation of sodium sulfide, however, will predominate, particularly in view of the high excess of sulfur over sodium so that a smelt of extremely high sodium sulfide content will be formed.

That a very high content of sodium sulfide will result in a composition of extremely high melting point will be evident from Table I which illustrates the variations in fusion temperatures of various mixtures of $Na_2S$ and $Na_2CO_3$. In column 3, the mixtures of column 1 have been calculated to express the total $Na_2O$ present as $Na_2S$ which for this two component system is equivalent to the sulfidity. It will be noted that under reducing conditions in the furnace, neglecting any loss of sulfur in the stack gases, one molecule of $Na_2SO_3$ will theoretically give one molecule of $Na_2S$ in the smelt.

Table I

| Percent $Na_2S$ in $Na_2S$–$Na_2CO_3$ Mixture | Fusion Point, °C. | Percent of Total $Na_2O$ Present as $Na_2S$ |
| --- | --- | --- |
| 0 | 852 | 0 |
| 6 | 830 | 8.0 |
| 15 | 815 | 19.3 |
| 30 | 805 | 36.7 |
| 38 | 800 | 45.4 |
| 42.5 | 795 | 50.0 |
| 50 | 810 | 57.5 |
| 60 | 835 | 67.0 |
| 70 | 890 | 76.0 |
| 75 | 940 | 80.3 |
| 82 | 970–990 | 86.0 |
| 100 | 1,180 | 100 |

In actual smelting operations, the smelt will contain appreciable amounts of sodium sulfate and minor amounts of other sodium salts. These will tend to lower somewhat the fusion points given above for mixtures of pure sodium carbonate and sodium sulfide. For example, in one sample of smelt in which the percentage of the total $Na_2O$ present as $Na_2S$ was 45.0%, the $Na_2CO_3$ 45.0% and $Na_2SO_4$ 10.0%, the fusion point was 738° C. In another sample of smelt in which the percentage of the total $Na_2O$ present as $Na_2S$ was 70.0%, the $Na_2CO_3$ 20% and $Na_2SO_4$ 10.0%, the fusion point was 777° C.

As used in kraft pulping practice, and as used herein, the term sulfidity refers to the ratio of $Na_2S$ to the sum of $Na_2S+Na_2CO_3$ all expressed on an $Na_2O$ (i. e. molar) basis.

In order to provide, by means of sodium carbonate, a smelt of sufficient fluidity to be readily recovered from conventional smelting furnaces of the type used in the kraft pulping industry, it is necessary to treat the sulfite waste liquor with sufficient sodium carbonate to (1) neutralize free lignosulfonic acids and free $SO_2$, (2) provide sufficient additional sodium carbonate in the liquor to be equivalent to the $SO_2$ resulting from combustion according to the above equation (this being equivalent to a smelt of 100% sulfidity) and (3) add sufficient excess sodium carbonate over and above this to produce a smelt containing a large portion of sodium carbonate.

Table I above indicates that optimum results are obtained by having present sufficient excess sodium carbonate to produce a smelt of about 50% sulfidity. In practice, however, it will frequently be advantageous to add sufficient sodium carbonate to the waste liquor before furnacing or smelting to produce a smelt of about 25–50% sulfidity or even lower. While the reason for this is not clear, it is believed to be due to the fact that in addition to the preponderance of sodium carbonate and sodium sulfide there will always be present smaller amounts of other sodium chemicals such as sodium sulfate, thiosulfate, and, if salt-water floated wood has been used, sodium chloride. These will modify the properties of the smelt.

There could be certain disadvantages in adding aqueous solutions of sodium carbonate to waste liquor for neutralization and sulfidity reduction prior to furnacing. Due to the limited solubility of sodium salts of carbonic acid and the large amount of sodium carbonate required for addition, an excessive burden of water would be added along with the chemical requiring considerable additional evaporation. For example, when using a sodium carbonate solution of 100 grams per liter concentration (which can be readily obtained by carbonating a sodium sulfide-containing smelt in solution) 90 pounds of water would be added for each 10 pounds of carbonate. Thus, it will be seen that it would be a tremendous advantage if the large amount of sodium carbonate to be added to the sulfite waste liquor to obtain the benefits outlined above could be added in solid form.

Our invention provides a simple, practical process for converting the sodium content of soda-base acid sulfite waste liquor into a fluid smelt predominating in sodium carbonate and sodium sulfide, with concomitant recovery of heat and recovery in the smelt of a substantial portion of the sulfur originally present in the waste liquor. The invention further provides a simple process for converting this smelt into solid sodium carbonate of such high purity that it may be used for the preparation of acid sulfite digestion liquor, and which is so nearly water-free that it may be used for neutralizing and lowering the sulfidity of the sulfite waste liquor without resulting uneconomical dilution. Simultaneously, the sulfide content of the smelt is recovered in the form of concentrated hydrogen sulfide which can be readily burned to sulfur dioxide of such concentration that it can be readily and conveniently used in the preparation of acid sulfite digestion liquor.

The process of the invention comprises several interrelated cyclic systems for the recovery of soda-base chemicals from a soda-base acid-sulfite pulping operation characterized by the incorporation in the waste liquor of sodium carbonate, which is formed in the process, to lower the melting point of the smelt to a point where it will flow out of the furnace.

One important feature of the invention is that we form a low melting point smelt of sodium sulfide fluxed with sodium carbonate and we dissolve this smelt in such a limited amount of water that we form a slurry of crystals of sodium carbonate in a concentrated solution of sodium sulfide. Advantageously, we form this slurry from mother liquor returned from the stripping operation wherein hydrogen sulfide is recovered and which contains these salts in high concentration.

In accordance with a more complete process of the invention, we separate from the sodium sulfide solution of the slurry a solid portion consisting of crystallized sodium carbonate and smaller amounts of crystalline sodium sulfate formed in the solution, which solid portion is generally divided into two parts, one part of which is added to the waste liquor to flux the sodium sulfide of the smelt and the other part is used to make up soda-base acid sulfite cooking liquor. The residual sodium sulfide solution from the slurry is subjected to a pressure carbonation with carbon dioxide, followed by vacuum stripping to release concentrated hydrogen sulfide and form in solution sodium carbonate. The concentrated hydrogen sulfide which readily supports combustion is burned to form sulfur dioxide which is reacted with one part of the separated crystalline sodium carbonate to prepare soda-base acid sulfite digestion liquor for return to the pulping operation. In the carbonation and stripping operation, the solution of sodium sulfide is treated with carbon dioxide under a pressure of at least 16 pounds per square inch absolute, preferably at a temperature of from 50° to 150° C., and the solution is then stripped under a vacuum of from 5 to 29 inches of mercury, as described in our copending application Serial No. 166,683, filed June 7, 1950, now abandoned, which subject matter is incorporated in application Serial No. 415,754, filed March 12, 1954.

While we ordinarily find it sufficient to subject the sodium sulfide solution to a single stage of pressure carbonation followed by vacuum stripping, we may use a plurality of pressure carbonations, each followed by vacuum stripping as described in our copending application, Serial No. 166,681, filed June 7, 1950, now abandoned, which subject matter is incorporated in application Serial No. 415,817, filed March 12, 1954.

In a particularly advantageous operation of the invention, the waste liquor from the soda-base acid sulfite digestion of wood chips is evaporated and burned under reducing conditions to form a free-flowing smelt which is partially dissolved in such a limited amount of water, preferably a mother liquor from the stripping operation containing sodium carbonate and sodium sulfide, to form a concentrated solution of sodium sulfide in a slurry of sodium carbonate and sodium sulfate, which concentrated solution after removal of the crystals is subjected to carbonation followed by stripping to remove hydrogen sulfide as aforesaid. The operation of the invention provides at least four interdependent cyclic systems comprising: (a) circulating the stripped liquor to the smelt dissolving tank to form a concentrated solution of sodium sulfide containing sodium carbonate crystals as a slurry, (b) separating part of the sodium carbonate crystals and directing them to the waste liquor prior to furnacing as a flux to lower the melting temperature of the smelt, (c) directing the other part of the sodium carbonate crystals to a soda-base acid sulfite liquor make-up operation, and (d) subjecting the sodium sulfide solution to pressure carbonation and vacuum stripping to release concentrated hydrogen sulfide, then oxidizing the hydrogen sulfide to sulfur dioxide and passing the sulfur dioxide to the soda-base acid sulfite liquor make-up operation and eventually returning the make-up soda-base acid sulfite liquor to the digestion operation.

Our invention gives the important advantage of a low melting point smelt that is fluxed with sodium carbonate prepared in the operation and of a concentrated solution of sodium sulfide from which the sulfur may be recovered efficiently and in high concentration for return to the operation to form make-up liquor. Other advantages will be apparent from the following discussion.

In the accompanying drawings:

Fig. 1 is a diagrammatic illustration of the four important interdependent cyclic systems in a process of the invention, and Fig. 2 is a flow-sheet of an arrangement of apparatus suitable for carrying out an operation in accordance with the process of the invention.

The aforementioned four interdependent cyclic systems of the improved process are illustrated generally in Fig. 1. The original waste liquor from the wood digestion, known as sulfite waste liquor (SWL), if evaporated and burned would form a high melting point smelt that would be difficult to remove from the smelting furnace. In our process, the melting point of the smelt is lowered by adding solid sodium carbonate from the slurry to the sulfite waste liquor by cycle 1. The resulting low melting point smelt is dissolved in a minimum amount of water, advantageously by adding stripped mother liquor from cycle 2 to form a slurry of sodium carbonate crystals in a concentrated solution of sodium sulfide. By using a limited amount of water at this point, and especially by using the stripped mother liquor which is a solution already rich in sodium carbonate and sodium sulfide, we effect a practical separation of crystals of sodium carbonate for use in the process and also obtain a concentrated solution of sodium sulfide from which sulfur is recovered. The other part of the sodium carbonate crystals is sent to the acid sulfite digestion liquor make-up by cycle 3 where it is reacted with sulfur dioxide from cycle 4 to form soda-base acid sulfite liquor for return to the digester. It will be apparent that the process comprises four interdependent cyclic systems which contribute to an efficient operation for the recovery of soda-base chemicals in the digestion of wood by the soda-base acid-sulfite process.

In carrying out an operation in an arrangement of apparatus such as that illustrated in Fig. 2, the wood chips are subjected to any suitable digestion with soda-base acid sulfite cooking liquor in the digester 1. The waste liquor from the digestion is treated at 2 with solid sodium carbonate releasing carbon dioxide which may be used in the carbonation and the treated liquor may be clarified at 3 for the removal of sludge. The treated liquor with or without such clarification is concentrated by evaporation, preferably to at least 50% total solids content as in multiple-effect evaporators 4 (or in multiple-effect evaporators followed by evaporation in direct contact with flue gas as in cascade or disc evaporators), and the concentrate is burned in the smelting furnace 5. This furnace may be similar to the conventional heat and chemical recovery units now used in the kraft and soda pulp mills. The furnace is operated under reducing conditions and the resulting sodium sulfide, fluxed with sodium carbonate, produces a low melting point smelt that flows out of the furnace to the slurry tank 6. The low sulfidity of the smelt tends to minimize any possibility of explosions resulting from adding the molten smelt to the dissolving liquor (which may be water or preferably mother liquor from the stripper). This liquor is quite concentrated and may contain solids consisting, for example, of about 70% sodium carbonate and 30% sodium sulfide.

Alternatively, the smelt after issuing from the furnace may be cooled and solidified and then added to the dissolving liquor or water in such form. The cooling would obviate the necessity of adding excess water to dissipate the sensible heat of hot molten smelt as steam. In any event only a limited amount of water is added to the smelt (as an example, to 1 part of smelt 1 part of water after allowing for any evaporation), so that substantially all the sodium sulfide is dissolved without appreciably dissolving the sodium carbonate. A certain amount of sodium sulfate will be present in the smelt due to incomplete reduction and will largely crystallize out along with the preponderant amount of sodium carbonate to form a slurry in a concentrated solution of sodium sulfide. The slurry is filtered in the filter or clarifier 7, the solution of sodium sulfide being sent to the carbonator 8 together with some added water and the solids of the slurry, namely, sodium carbonate and sodium sulfate, are divided into two parts. One part is mixed with the sulfite waste liquor for neutralization and sulfidity reduction as aforesaid, while the other part is washed at 9 with water or with wash water containing some sodium carbonate, sodium sulfate, and the washings containing sodium sulfide are returned to the filter while the washed crystals of sodium carbonate and sodium sulfate are dissolved in water at the acid-makeup unit 11 for combination with sulfur dioxide to form soda-base acid sulfite liquor which is passed to the digester 1 for the digestion of the chips.

The concentrated solution of sodium sulfide from the filter 7, which may have a sulfidity of around 90%, is passed into the pressure carbonation chamber 8 and then into the vacuum stripping unit 12 for the recovery of hydrogen sulfide and the formation of a mother liquor of reduced sulfidity, e. g. containing solids in the ratio of around 70% of sodium carbonate and 30% sodium sulfide. This single stage carbonation and stripping may be carried out as described in our copending application, Serial No. 415,754.

The stripping operation may be carried out in any type of apparatus commonly used for stripping such as a packed tower and under a vacuum of from 5 to 29 inches of mercury. In that it follows a pressure carbonation a flashing is involved, and a large proportion of the hydrogen sulfide is evolved in highly concentrated form with but little dilution with carbon dioxide resulting from decomposition of bicarbonate.

In the preferred form of our invention, the sulfide-containing solution is subjected to a carbonation treatment in which the solution is treated preferably in a countercurrent manner, under pressure with a gas containing carbon dioxide, such carbonation treatment being followed by steam stripping under a vacuum of from 5 to 29 inches of mercury, preferably at least 20 inches of mercury, to remove volatile hydrogen sulfide in concentrated form, whereby the sulfide content of the smelt solution is substantially lowered. In this preferred method of operation, the carbonation treatment is generally effected at a temperature of 50°–150° C. with a gas pressure of 20–165 pounds per square inch absolute, such that the mol ratio of carbon dioxide absorbed to total titratable alkali in the solution is in the range of 0.6 to 1.5. In that carbonation is carried out at an elevated temperature and that sodium carbonate is consumed in the reaction with sodium hydrosulfide in the stripping operation, relatively concentrated solutions of soda salts (e. g., of the order of 100 gm. per liter as $Na_2O$) may be treated without the formation of precipitates during processing.

By "total titratable alkali" in the above is meant the basicity equivalent to a standard acid titration to the methyl orange end point. In the case of soda smelts, this would include all of the sulfide, carbonate, and caustic soda, and one-half of the sulfite, and would exclude such salts as thiosulfate, sulfate, and chloride.

Under the stripping conditions of the invention, i. e., releasing the hot pressure carbonated solution into a vacuum, thus contacting it with steam at low temperature, very little bicarbonate decomposition occurs, with the result that the gas evolved is substantially hydrogen sulfide and water vapor. Steam is used as the stripping agent since a recovery of concentrated hydrogen sulfide gas can be effected simply by condensing the steam from the effluent mixture of steam and hydrogen sulfide. Use of low pressure in stripping as applied to this operation is an important technical feature of our invention. Reduced pressure markedly improves the conversion and apparently reduces carbon dioxide losses from bicarbonate decomposition.

Irrespective of whether pure $CO_2$ or flue gas is used for the carbonation, no attempt is made to completely eliminate sulfide in stripping since, as the stripping operation approaches completion, the efficiency of stripping with regard to steam consumption decreases tremendously.

The carbonation and stripping operations may be carried out in any type of equipment conventionally employed for gas absorption or stripping operations, for example in packed columns, plate columns, spray columns, and continuous liquid phase columns. Agitated gas dispersion equipment might be advantageously used for the carbonation stage.

Flue gas may be used to advantage, requiring only slightly higher operating pressures or larger equipment than when using purer gas. Where a portion of the solid sodium carbonate produced is to be used for the preparation of acid sulfite digestion liquor, a high degree of purity of the carbonate is desirable and it will be advisable to purify the flue gas by removing suspended matter and scrubbing out any sulfur dioxide or other undesirable contaminant. Lime kiln gas, if available, may often be freed from suspended matter and used to advantage, since it will normally contain from 30% to 45% carbon dioxide.

When using diluted carbon dioxide (e. g., flue gas or lime kiln gas) in the pressure carbonation, countercurrent flow is advantageously used. Under these conditions, the gas leaving the top of the carbonator is in contact with highly alkaline solutions (i. e., smelt solutions). Probably because of the high alkalinity at the point of gas exit, the amount of hydrogen sulfide leaving the top of the carbonator in dilute form is very low. As a result, the preponderant portion of the total hydrogen sulfide produced is liberated in the stripping operations in highly concentrated, readily usable form.

Using pure carbon dioxide for carbonation, thiosulfate formation is negligible. Using diluted carbon dioxide containing oxygen (e. g., flue gas) some thiosulfate is formed but the amount is surprisingly low and, therefore, will not tend to build up rapidly in the system. The small amount of thiosulfate formed by use of oxygen-containing flue gas in the solution carbonation process of our invention is in striking contrast to the very large amounts of thiosulfate produced when solid smelt is carbonated by flue gas.

The solution obtained from this carbonation treatment is introduced into a stripper which is maintained at a pressure substantially below the carbonation pressure and below the vapor pressure of water at the temperature of the carbonation, whereby a "flashing" or sudden release of water vapor occurs accompanied by the simultaneous evolution of a portion of the hydrogen sulfide with only a relatively small proportion of carbon dioxide. Although not an essential feature of our process, it has been found desirable to allow the flashing to occur in the vapor space at the top of a column, whereupon the remaining liquid passes down through this column, which may be a packed column, plate column, or similar equipment, in contact with ascending steam supplied to the base of the column. This effects the efficient removal of the hydrogen sulfide formed in the process.

The recovered $H_2S$ from the vacuum stripper will contain some steam which may be condensed out resulting in recovery of the $H_2S$ at a high concentration. This may be readily oxidized by burning with air to form sulfur dioxide for use in the preparation of acid sulfite digestion liquor. This sulfur dioxide is absorbed in a solution of the sodium carbonate from the slurry which is dissolved and passed into the unit for cooking liquor make-up to produce soda-base acid sulfite liquor for digestion.

The invention may also be used in connection with the process of our copending application Serial No. 415,817 and also Letters Patent 2,656,244 of Kenneth Russell Gray and Hartzell Lance Crosby, filed July 15, 1950. Where such a combination is effected all the advantages outlined above which are obtained by the production of solid sodium carbonate for return to the sulfite waste liquor are gained, the only modification being that soda chemicals required for the acid sulfite digestion liquor are produced by one of the cited copending processes.

In one method of carrying out such integration, the smelt from the furnace is divided into two portions. The larger portion will be treated by the process of the present invention to produce solid sodium carbonate for addition to the sulfite waste liquor prior to furnacing and to recover hydrogen sulfide. The smaller portion of the smelt will be dissolved in water and may be treated by the ion exchange process of said Patent 2,656,244 to produce soda-base acid sulfite digestion liquor directly. According to this process the solution containing this portion of the smelt is contacted with a carboxylic acid-type or phenolic-type cation exchange resin in hydrogen form whereby sodium is adsorbed on the resin and a mixture of $CO_2$ and $H_2S$ may be evolved. The adsorbed sodium is subsequently desorbed from the resin by a sulfurous acid solution to produce soda base acid sulfite digestion liquor. The aqueous effluent from this resin treatment containing unadsorbed cations and anions may be added to the smelt dissolving tank 6 in Fig. 2. Any mixture of $CO_2$ and $H_2S$ evolved may be added to the $H_2S$ evolved from the stripper 12 or may be mixed with the flue gas or other $CO_2$ going to the carbonator 8.

Alternatively, the smaller portion of the smelt after dissolving in water may be treated by the multi-stage solution process of our pending application Serial No. 415,817, to produce a solution of sulfide-free sodium carbonate which, by reaction with sulfur dioxide or sulfur dioxide containing gas, may be converted to soda-base acid sulfite digestion liquor. In these two methods of integration where the solid sodium carbonate produced by the present invention is used solely for addition to the waste liquor, it is not necessary to purify the flue gas used in step 8 from suspended solids.

Thus, in the case of integration with the ion exchange process of said Patent 2,656,244 for the production of acid sulfite digestion liquor, no purification of any of the flue gas would be required. In the case of integration with the multi-stage solution carbonation process, Serial No. 415,817, only a sufficient amount of purified flue gas would be needed to treat the smaller portion of the soda chemicals which are to be converted by the carbonation procedure into acid sulfite digestion liquor. Frequently this amount of $CO_2$ will be readily available in comparatively pure form from an alternative source, such as from the reaction of sodium carbonate with $SO_2$ to produce acid sulfite digestion liquor or from the neutralization of sulfite waste liquor.

A further method of integrating the invention with the ion exchange process of said Patent 2,656,244 for the preparation of acid sulfite digestion liquor, involves treating the mother liquor from the stripper (step 12, Fig. 2) by means of such ion exchange process. This serves to produce a very pure sodium bisulfite-sulfurous acid solution for wood digestion.

We claim:

1. In recovering chemicals and heat from soda-base acid-sulfite waste liquor, the improvement which comprises evaporating the liquor and burning the concentrate in a furnace to form a smelt, adding to the smelt stripped aqueous liquor from the process to form a slurry of sodium carbonate crystals in a concentrated solution of sodium sulfide, separating sodium carbonate crystals from the slurry, circulating part of the sodium carbonate crystals back to the waste liquor to flux the contained chemicals and lower the melting temperature of the smelt, directing the other part of the sodium carbonate to soda-base acid-sulfite liquor make-up, subjecting the concentrated sodium sulfide solution to carbonation and steam stripping to form hydrogen sulfide and said stripped aqueous liquor, oxidizing the hydrogen sulfide to sulfur dioxide, reacting the sulfur dioxide with the sodium carbonate to make up the soda-base acid-sulfite liquor, said carbonation being carried out at a temperature above 50° C. under a pressure of at least 16 pounds per square inch absolute and said stripping being carried out under a vacuum of from 5 to 29 inches of mercury.

2. In recovering chemicals from soda-base acid-sulfite liquor, the improvement which comprises evaporating the sulfite waste liquor and burning the resulting concentrate under reducing conditions to form a smelt, forming a concentrated sodium sulfide solution of said smelt and subjecting said solution to carbonation and stripping to form a stripped liquor and hydrogen sulfide, in said operation providing at least four interdependent cyclic systems comprising (1) circulating stripped liquor to the smelt to form the concentrated solution of sodium sulfide and a slurry of sodium carbonate crystals, (2) separating part of the sodium carbonate crystals and directing them to the waste liquor as a flux to lower the melting temperature of the smelt, (3) directing the other part of the sodium carbonate crystals to a soda-base acid-sulfite liquor make-up operation, and (4) oxidizing the hydrogen sulfide to sulfur dioxide and passing the sulfur dioxide to the soda-base acid-sulfite liquor make-up operation.

3. In recovering chemicals from soda-base acid-sulfite liquor, the improvement which comprises evaporating the sulfite waste liquor and burning the resulting concentrate under reducing conditions to form a smelt containing sodium sulfide and sodium carbonate, adding to the smelt such a limited quantity of water that a concentrated solution of sodium sulfide results and a slurry of sodium carbonate and sodium sulfate crystals form, incorporating at least a part of the sodium carbonate crystals in the sulfite waste liquor to serve as a flux for the smelt, and subjecting the sodium sulfide solution from the smelt to treatment for the recovery of sulfur compound.

4. In recovering chemicals from soda-base acid-sulfite liquor, the improvement which comprises evaporating the sulfite waste liquor and burning the resulting concentrate under reducing conditions to form a smelt containing sodium sulfide and sodium carbonate, dissolving at least a part of the smelt in such a limited amount of water that a slurry is formed consisting of crystals of sodium carbonate and sodium sulfate in a concentrated solution of sodium sulfide, incorporating some of the sodium carbonate crystals from the slurry in the sulfite waste liquor to flux the smelt, subjecting the solution of sodium sulfide to carbonation with carbon dioxide without appreciably releasing hydrogen sulfide, and then subjecting the solution following carbonation to stripping under a vacuum to recover hydrogen sulfide.

5. In recovering chemicals from soda-base acid-sulfite waste liquor, the improvement which comprises evaporating the sulfite waste liquor and burning the resulting concentrate under reducing conditions to form a fluid smelt, removing the fluid smelt for cooling and solidification, adding only a sufficient amount of water to the solid smelt to dissolve the sodium sulfide without appreciably dissolving the sodium carbonate to form a slurry in a concentrated solution of sodium sulfide, separating the solution of sodium sulfide from the slurry and subjecting the solution to carbonation and stripping, dividing the solid portion of the slurry comprising sodium carbonate crystals into two parts, incorporating one part in the sulfite waste liquor for neutralization and sulfidity reduction and to serve as a flux for the smelt produced therefrom, and reacting the sodium carbonate of the other part with sulfur dioxide to form soda-base acid-sulfite liquor.

6. In recovering chemicals and heat from soda-base acid sulfite waste liquor, the improvement which comprises evaporating and burning the concentrate in a furnace to form a smelt, dividing the smelt into two parts, adding to one part of the smelt stripped aqueous liquor from the process to form a slurry of sodium carbonate crystals in a concentrated solution of sodium sulfide, separating the sodium carbonate crystals from the slurry and adding them to the sulfite waste liquor prior to furnacing to serve as a flux for the smelt, subjecting the sodium sulfide solution to carbonation and steam stripping to form hydrogen sulfide and said stripped aqueous liquor, oxidizing the hydrogen sulfide to sulfur dioxide, dissolving the other part of the smelt in water, contacting this solution with a weakly acidic cation exchange resin from the class consisting of carboxylic acid-type and phenolic-type cation exchange resin in the hydrogen state whereby sodium is adsorbed, and desorbing the adsorbed sodium with a solution of the said sulfur dioxide to produce soda-base acid sulfite digestion liquor.

7. In recovering chemicals and heat from soda-base acid sulfite waste liquor, the improvement which comprises evaporating and burning the concentrate in a furnace to form a smelt, adding to the smelt stripped aqueous liquor from the process to form a slurry of sodium carbonate crystals in a concentrated solution of sodium sulfide, separating the sodium carbonate crystals from the slurry, and adding them to the sulfite waste liquor prior to furnacing to serve as a flux for the smelt, subjecting the sodium sulfide solution to carbonation and steam stripping to form hydrogen sulfide and stripped aqueous liquor, oxidizing the hydrogen sulfide to sulfur dioxide, dividing the stripped aqueous liquor into two parts and adding one part to the said smelt, contacting the other part of the stripped aqueous liquor with a weakly acidic cation exchange resin selected from the class consisting of a carboxylic acid-type and a phenolic-type cation exchange resin in the hydrogen state whereby sodium is adsorbed, and desorbing the adsorbed sodium with a solution of the said sulfur dioxide to produce soda-base acid sulfite digestion liquor.

8. In recovering chemicals and heat from soda-base acid sulfite waste liquor, the improvement which comprises evaporating and burning the concentrate in a furnace to form a smelt, adding to the smelt stripped aqueous liquor from the process to form a slurry of sodium carbonate crystals in a concentrated solution of sodium sulfide, separating the sodium carbonate crystals from the slurry and adding them to the sulfite waste liquor prior to furnacing to serve as a flux for the smelt, subjecting the sodium sulfide solution to carbonation and steam stripping to form hydrogen sulfide and stripped aqueous liquor containing sodium carbonate and sodium sulfide, oxidizing the hydrogen sulfide to sulfur dioxide, dividing the stripped aqueous liquor into two parts and adding one part to the said smelt, subjecting the other part of the stripped aqueous liquor to additional carbonation and steam stripping to produce a solution of sulfide-free sodium carbonate, and absorbing said sulfur dioxide in this solution of sulfide-free sodium carbonate to produce soda-base acid sulfite digestion liquor.

9. In recovering chemicals and heat from soda-base acid-sulfite waste liquor, the improvement which comprises evaporating the liquor and burning the concentrate in a furnace to form a smelt, adding to at least a portion of the smelt stripped aqueous liquor from the process to form a slurry of sodium carbonate crystals in a concentrated solution of sodium sulfide, separating sodium carbonate crystals from the slurry, circulating at least a part of the sodium carbonate crystals back to the waste liquor to flux the contained chemicals and lower the melting temperature of the smelt, subjecting the concentrated sodium sulfide solution to carbonation and steam stripping to form hydrogen sulfide and said stripped aqueous liquor, said carbonation being carried out at a temperature above 50° C. under a pressure of at least 16 pounds per square inch absolute and said stripping being carried out under a vacuum of from 5 to 29 inches of mercury.

(References on following page)

References Cited in the file of this patent

UNITED STATES PATENTS

| | | | |
|---|---|---|---|
| 1,864,619 | Richter | June 28, | 1932 |
| 1,904,170 | Richter | Apr. 18, | 1933 |
| 1,934,655 | Bradley et al. | Nov. 7, | 1933 |
| 1,983,789 | Bradley et al. | Dec. 11, | 1934 |
| 2,047,032 | Richter | July 7, | 1936 |
| 2,244,325 | Bird | June 3, | 1941 |
| 2,392,435 | Tyler | Jan. 8, | 1946 |
| 2,496,550 | Larrsson et al. | Feb. 7, | 1950 |
| 2,656,244 | Gray et al. | Oct. 20, | 1953 |
| 2,701,763 | Sivola | Feb. 8, | 1955 |
| 2,792,350 | Bradley et al. | May 14, | 1957 |